United States Patent
Koshy et al.

(10) Patent No.: US 11,159,489 B2
(45) Date of Patent: Oct. 26, 2021

(54) MULTI-LINK VPN LINK SELECTION SYSTEM

(71) Applicant: Dell Products L.P., Round Rock, TX (US)

(72) Inventors: Kamal Koshy, Austin, TX (US); Dileep Kumar Soma, Austin, TX (US); Vivek Viswanathan Iyer, Austin, TX (US); Anantha Boyapalle, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 16/775,636

(22) Filed: Jan. 29, 2020

(65) Prior Publication Data
US 2021/0234834 A1 Jul. 29, 2021

(51) Int. Cl.
*H04L 29/06* (2006.01)
*H04L 29/08* (2006.01)

(52) U.S. Cl.
CPC ........ *H04L 63/0272* (2013.01); *H04L 67/322* (2013.01)

(58) Field of Classification Search
CPC ............................ H04L 63/0272; H04L 67/322
See application file for complete search history.

(56) References Cited

U.S. PATENT DOCUMENTS

| | | | | |
|---|---|---|---|---|
| 8,848,608 B1* | 9/2014 | Addepalli | ........... | H04L 61/2592 370/328 |
| 9,119,039 B2* | 8/2015 | Egner | ................... | H04W 4/027 |
| 9,167,591 B2* | 10/2015 | Egner | ................. | H04W 72/085 |
| 9,300,570 B2* | 3/2016 | Hengeveld | ............. | H04L 47/24 |
| 9,801,071 B2 | 10/2017 | Wynn et al. | | |
| 9,848,357 B2* | 12/2017 | Egner | ................. | H04W 4/027 |
| 9,882,810 B2* | 1/2018 | Wang | ................... | H04L 45/586 |
| 10,003,655 B2* | 6/2018 | Mishra | ................ | H04L 67/1002 |
| 10,958,620 B1* | 3/2021 | Wei | ........................ | H04L 45/125 |
| 11,051,164 B2* | 6/2021 | Nair | .................... | H04M 3/5166 |
| 2010/0058064 A1* | 3/2010 | Kirovski | ............. | H04L 63/0853 713/176 |
| 2014/0298446 A1* | 10/2014 | Grand | ................. | H04L 12/4633 726/15 |
| 2017/0134787 A1* | 5/2017 | Wu | ........................ | H04H 60/91 |
| 2017/0171156 A1* | 6/2017 | Schultz | .................... | H04L 9/30 |
| 2018/0048481 A1* | 2/2018 | Wann | .................. | G06Q 10/087 |
| 2021/0112011 A1* | 4/2021 | K S | ........................ | G06N 20/00 |

* cited by examiner

*Primary Examiner* — Jerry B Dennison
(74) *Attorney, Agent, or Firm* — Joseph Mencher

(57) ABSTRACT

A multi-link VPN link selection system includes a multi-link VPN server device that provides a VPN connection to application server device(s) for a computing device. The computing device monitors each of its network interfaces that each provide a respective link to the VPN connection and, in response, identifies one or more QoS parameters associated with each of those network interfaces. When the computing device receives data traffic from application(s) operating on the computing device, it identifies a network transmission requirement associated with that data traffic, determines one of the network interfaces that is associated with one or more QoS parameters that satisfy the network transmission requirements associated with that data traffic; and transmits that data traffic via that network interface and over the respective link provided by that network interface to the application server device(s) via the VPN connection provided by the multi-link VPN server device.

20 Claims, 10 Drawing Sheets

MULTI-LINK VPN LINK SELECTION SYSTEM

BACKGROUND

The present disclosure relates generally to information handling systems, and more particularly to selecting from multiple links available to an information handling system in order to transmit data to a Virtual Private Network (VPN).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices, desktop computing devices, laptop/notebook computing devices, tablet computing devices, mobile phones, and/or other computing devices known in the art, sometimes utilize Virtual Private Networks (VPNs) that, for example, extend a private network across a public network, while enabling users to send and receive data across shared/public networks as if their computing devices were directly connected to their private network. One enhancement to VPN technology currently in development is "multi-link" VPN, which operates to take advantage of multiple different links available from a computing device to a network in order to provide connectivity to the VPN. For example, a computing device may include a wired Ethernet communication subsystem that provides a first link from the computing device to a network, a wireless Wifi communication subsystem that provides a second link from the computing device to the network, a wireless cellular communication system that provides a third link from the computing device to the network, and/or other communication system(s) providing other wired/wireless links from the computing device to the network, and multi-link VPN may operate to utilize any of those links to provide connectivity to the VPN. However, conventional multi-link VPN systems utilize the multiple available link for redundancy purposes (e.g., to switch to using a different link when a current link becomes unavailable), and the inventors of the present disclosure have recognized that conventional multi-link VPN systems fail to take advantage of efficiencies that may be realized when links available in the multi-link VPN system are selected based one, for example, the attributes associated with those links, as well as the data traffic (and/or application transmitting that data traffic) in some situations.

Accordingly, it would be desirable to provide a multi-link VPN system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a multi-link Virtual Private Network (VPN) link selection engine that is configured to: monitor each of a plurality of network interfaces that are coupled to the processing system and that each provide a respective link to a VPN connection and, in response, identify one or more Quality of Service (QoS) parameters associated with each of the plurality of network interfaces; and receive data traffic from at least one application and, in response: identify a network transmission requirement associated with that data traffic; determine one of the network interfaces that is included in the plurality of network interfaces, that provides one of the respective links to the VPN connection, and that is associated with one or more QoS parameters that satisfy the network transmission requirements associated with that data traffic; and transmit that data traffic via that one of the plurality of network interfaces that is associated with the one or more QoS parameters that satisfy the network transmission requirements associated with that data traffic and over the one of the respective links provided by that one of the plurality of network interfaces to at least one application server device via the VPN connection.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
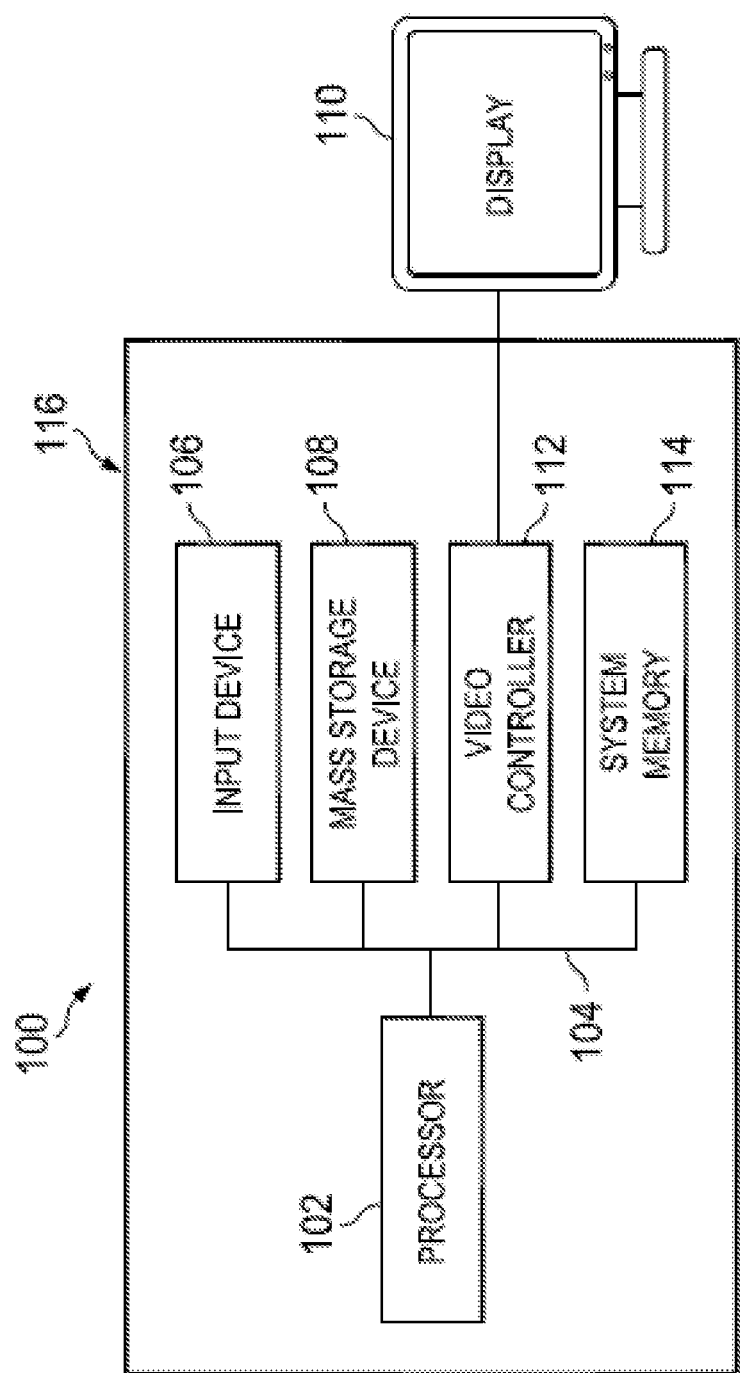
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
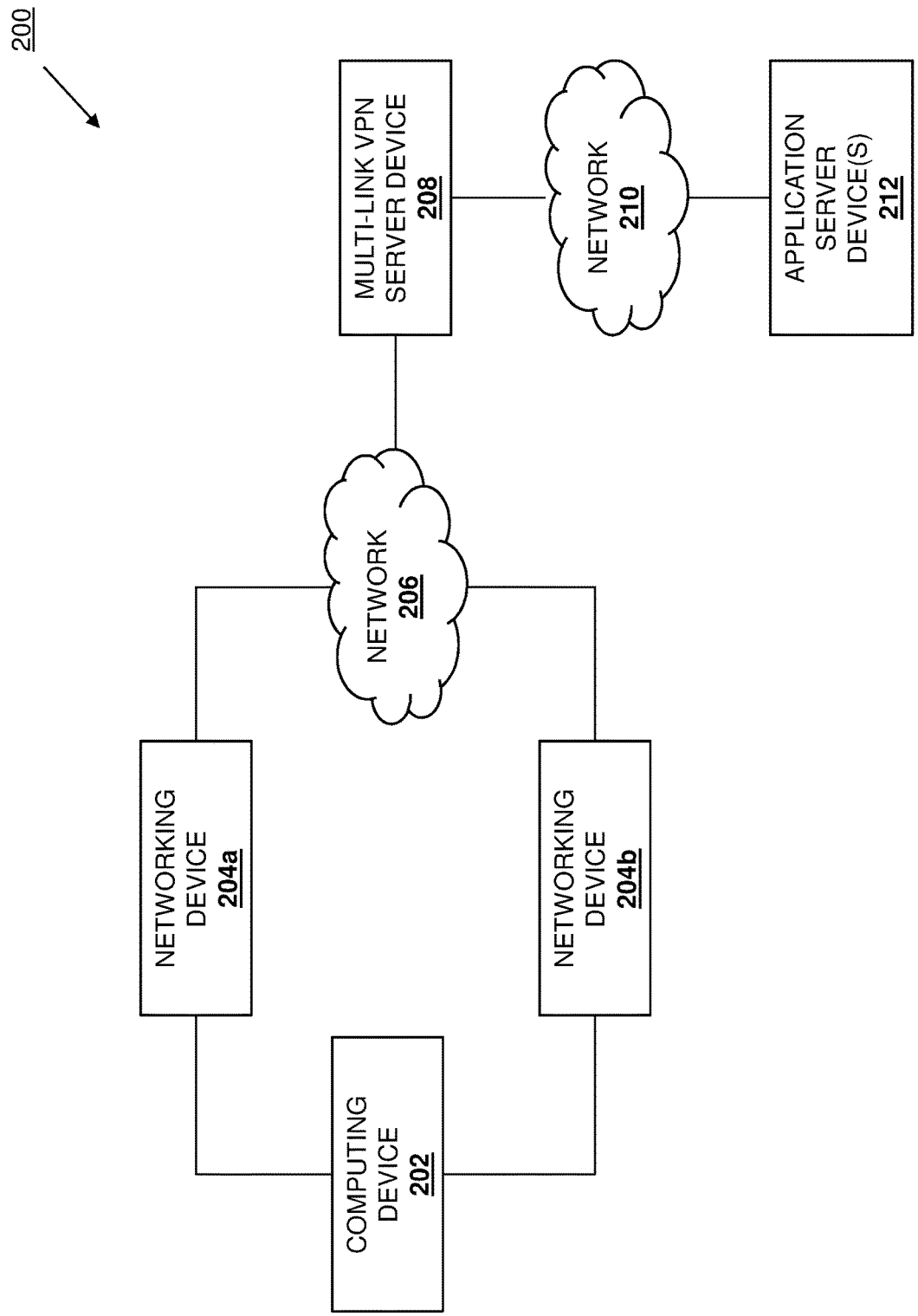
FIG. 2 is a schematic view illustrating an embodiment of a multi-link VPN link selection system.

Referring now to FIG. 2, an embodiment of a multi-link Virtual Private Network (VPN) link selection system 200 is illustrated. In the illustrated embodiment, the multi-link VPN link selection system 200 includes a computing device 202. In an embodiment, the computing device 202 may be provided by the IHS 100 discussed above with reference to FIG. 1, and/or may include some or all of the components of the IHS 100, and in specific examples may be provided by server computing devices, desktop computing devices, laptop/notebook computing devices, tablet computing devices, mobile phones, and/or other computing devices known in the art. However, while illustrated and discussed as being provided by a variety of specific computing devices, one of skill in the art in possession of the present disclosure will recognize that computing devices provided in the multi-link VPN link selection system 200 may include any devices that may be configured to operate similarly as the computing device 202 discussed below.

In the illustrated embodiment, the computing device is coupled to a pair of networking devices 204a and 204b. Either or both of the networking devices 204a and 204b may be provided by the IHS 100 discussed above with reference to FIG. 1, and/or may include some or all of the components of the IHS 100, and in specific examples, may be provided by router devices, switch devices, and/or other networking devices known in the art. However, while illustrated and discussed as being provided by a variety of specific networking devices, one of skill in the art in possession of the present disclosure will recognize that networking devices provided in the multi-link VPN link selection system 200 may include any devices that may be configured to operate similarly as the networking devices 202 discussed below. Furthermore, in the embodiments discussed below, each of the pair of networking devices 204a and 204b provide a respective network link, path, and/or other connection from the computing device 202 to an available VPN, and one of skill in the art in possession of the present disclosure will appreciate that additional networking devices may be provided in multi-link VPN link selection system 200 to provide additional network links, paths, or connections to an available VPN, or fewer networking devices may provide multiple network links, paths, or connections to an available VPN, while remaining within the scope of the present disclosure as well.

In the illustrated embodiment, each of the networking devices 204a and 204b are coupled to a network 206, which may be provided by a Local Area Network (LAN), the Internet, combinations thereof, and/or a variety of other network that would be apparent to one of skill in the art in possession of the present disclosure. Furthermore, a multi-link VPN server device 208 is coupled to the network 206, may be provided by the IHS 100 discussed above with reference to FIG. 1, and/or may include some or all of the components of the IHS 100, and in specific examples, may be provided by a server device that is configured to provide a VPN to a plurality of computing devices. Furthermore, while discussed as a single server device, one of skill in the art in possession of the present disclosure will appreciate that the functionality of the multi-link VPN server device 208 may be provided by multiple server devices and/or other computing devices while remaining within the scope of the present disclosure as well.

In the illustrated embodiment, the multi-link VPN server device 208 is coupled to a network 210, which may be provided by a Local Area Network (LAN), the Internet, combinations thereof, and/or a variety of other network that would be apparent to one of skill in the art in possession of the present disclosure. Furthermore, one or more application server device(s) 212 are coupled to the network 210, may be provided by the IHS 100 discussed above with reference to FIG. 1, and/or may include some or all of the components of the IHS 100, and in specific examples, may be provided by a server device that is configured to provide for application functionality for applications operating on a plurality of computing devices. Furthermore, while discussed as a single server device, one of skill in the art in possession of the present disclosure will appreciate that the functionality of the application server device 212 may be provided by multiple server devices and/or other computing devices while remaining within the scope of the present disclosure as well. While a specific multi-link VPN link selection system 200 has been illustrated and described, one of skill in the art in possession of the present disclosure will recognize that the multi-link VPN link selection system of the present disclosure may include a variety of components and component configurations while remaining within the scope of the present disclosure as well.

Figure 3:
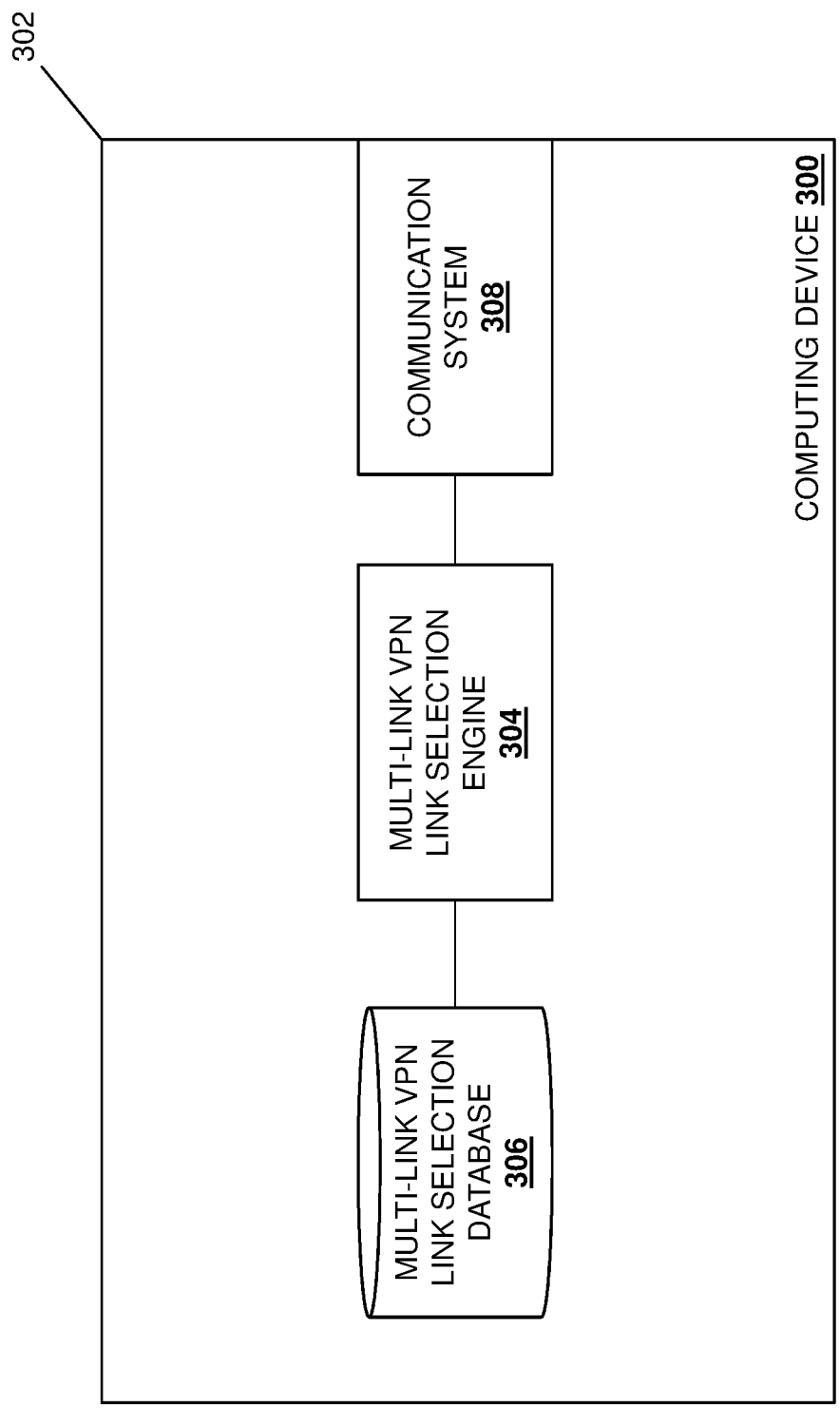
FIG. 3 is a schematic view illustrating an embodiment of a computing device that may be provided in the multi-link VPN link selection system of FIG. 2.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in specific examples may be provided by server computing devices, desktop computing devices, laptop/notebook computing devices, tablet computing devices, mobile phones, and/or other computing devices known in the art. Furthermore, while illustrated and discussed as being provided by particular computing devices, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a multi-link VPN link selection engine 304 that is configured to perform the functionality of the multi-link VPN link selection engines and/or computing devices discussed below.

The chassis 302 may also house a storage system (not illustrated, but which may include the storage 108 discussed above with reference to FIG. 1) that is coupled to the multi-link VPN link selection engine 304 (e.g., via a coupling between the storage system and the processing system) and that includes a multi-link VPN link selection database 306 that is configured to store any of the information utilized by the multi-link VPN link selection engine 304 below. The chassis 302 may also house a communication system 308 that is coupled to the multi-link VPN link selection engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, one of skill in the art in possession of the present disclosure will appreciate that the communication system 308 may include any of the multiple network interfaces (e.g., the wired network interfaces, wireless network interfaces, and/or other network interfaces discussed below) that provide the multiple links to the VPN discussed below. However, while a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional multi-link VPN device functionality, as well as the functionality discussed below, while remaining within the scope of the present disclosure as well.

Figure 4:
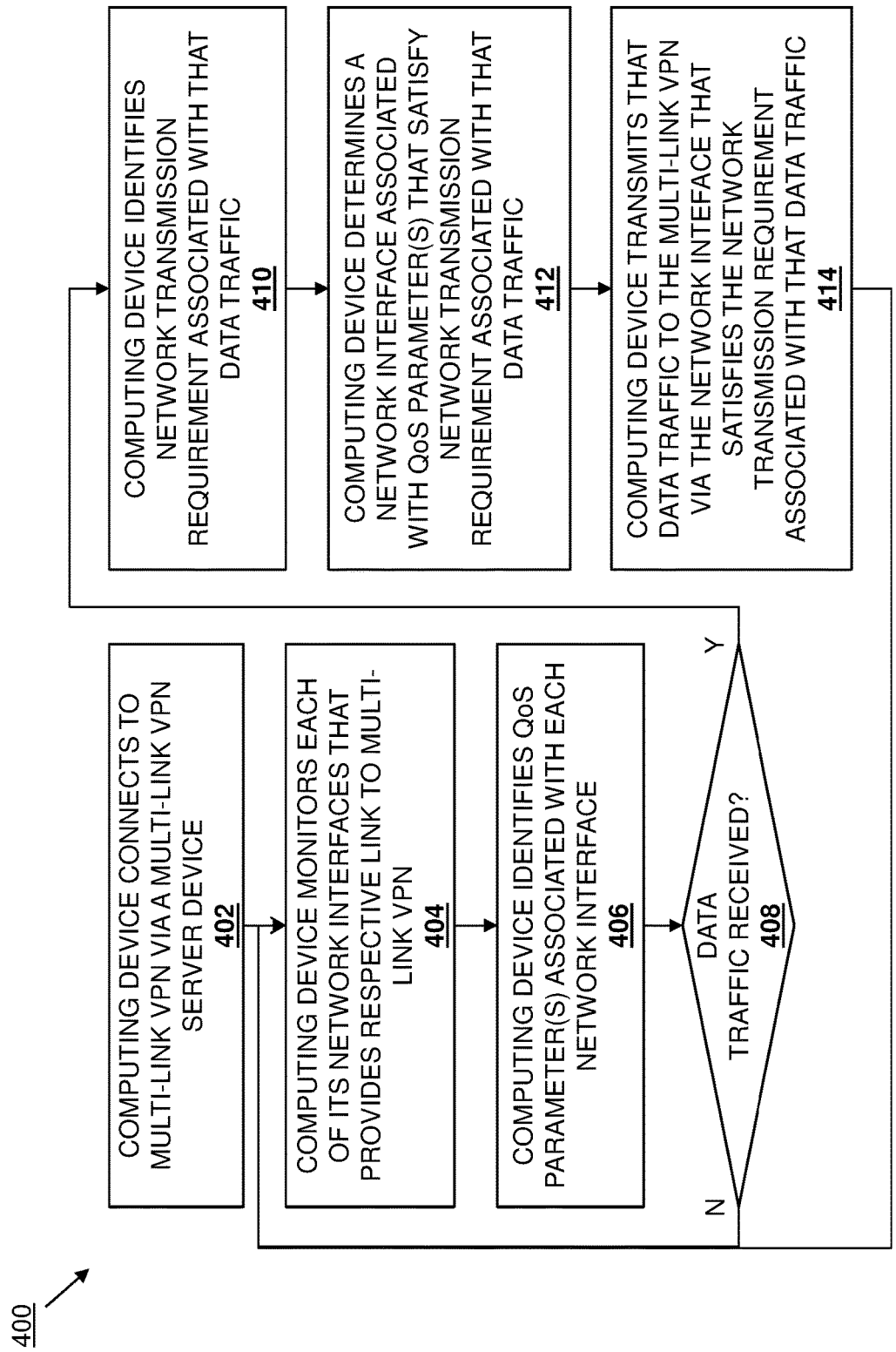
FIG. 4 is a flow chart illustrating an embodiment of a method for selecting links in a multi-link VPN for transmitting data traffic.

Referring now to FIG. 4, an embodiment of a method 400 for selecting links in a multi-link VPN for transmitting data traffic is illustrated. As discussed below, the systems and methods of the present disclosure provide for the selection between multiple links available for transmitting data traffic from a computing device to a VPN based on one or more QoS parameters associated with those links. For example, a multi-link VPN server device provides a VPN connection to at least one application server device, and a computing device coupled to the multi-link VPN server device monitors each of a plurality of its network interfaces that each provide a respective link to the VPN connection and, in response, identify one or more QoS parameters associated with each of the plurality of network interface. Whenever data traffic is received from at least one application operating on the computing device, the computing device may identify a network transmission requirement associated with that data traffic, determine one of the network interfaces that is associated with one or more QoS parameters that satisfy the network transmission requirements associated with that data traffic, and transmit that data traffic via that one of the plurality of network interfaces and over the one of the respective links provided by that one of the plurality of network interfaces to the at least one application server device via the VPN connection provided by the multi-link VPN server device. As such, multi-link VPN link selection systems and methods provided according to the teachings of the present disclosure may provide higher performance and/or more efficient data traffic transmission by a computing device via the transmission of respective data traffic to a VPN over the most appropriate link available in a multi-link VPN.

The method 400 begins at block 402 where a computing device connects to a multi-link VPN via a multi-link VPN server device. In an embodiment, at block 402, the computing device 202 may connect to a VPN provided by the multi-link VPN server device 208 via multiple links such that a multi-link VPN connection is provided between the computing device 202 and the multi-link VPN server device 208. For example, with reference to FIG. 5, the computing device 202 is illustrated including a pair of network interfaces 500 and 502 that, as discussed above, may both be provided by the communication system 308 discussed above with reference to FIG. 3. As such, the network interfaces 500 and/or 502 may be provided by wired network interfaces (e.g., a wired Ethernet interface), wireless network interfaces (e.g., a cellular wireless interface, a Wifi wireless interface, a BLUETOOTH® wireless interface, a Near Field Communication (NFC) wireless interface, and/or other wireless network interfaces known in the art), and/or any other network interfaces that would be apparent to one of skill in the art in possession of the present disclosure. One of skill in the art in possession of the present disclosure will appreciate that while only two network interfaces are illustrated and described in the examples below, any number of network interfaces may operate to provide one or more links to the multi-link VPN discussed below while remaining within the scope of the present disclosure as well. As such, different network interfaces available in the computing device 202/300 may have different attributes, data transmission capacities, and/or any other network interface properties that would be apparent to one of skill in the art in possession of the present disclosure. In addition, the multi-link VPN server device 208 is illustrated including a network interface 504 which may be provided by wired network interfaces (e.g., a wired Ethernet interface), wireless network interfaces (e.g., a cellular wireless interface, a Wifi wireless interface, a BLUETOOTH® wireless interface, a Near Field Communication (NFC) wireless interface, and/or other wireless network interfaces known in the art), and/or any other network interfaces that would be apparent to one of skill in the art in possession of the present disclosure.

In many embodiments, the multi-link VPN server device 208 may operate to provide a VPN, and a multi-link VPN connection may be established between the computing device 202 and the multi-link VPN server device 208. One of skill in the art in possession of the present disclosure will appreciate that the establishment of a multi-link VPN connection between a computing device and a multi-link VPN server device may include a variety of conventional VPN establishment operations, and that many of those conventional VPN establishment operations are not described herein in detail. However, for the purposes of the discussion below, during or prior to the method 400 the network interface 500 in the computing device 202 (which includes a PHYsical layer circuit (PHY) 500a and a Media Access Control (MAC) address 500b) may be assigned a "physical" Internet Protocol (IP) address 500c (i.e., an IP address associated with that physical network interface 500.) Similarly, during or prior to the method 400 the network interface 502 in the computing device 202 (which includes a PHY 502a and a MAC address 502b) may be assigned a "physical" IP address 502c (i.e., an IP address associated with that physical network interface 502.) Similarly as well, the establishment of the multi-link VPN connection at block 402 may include the network interface 504 in the multi-link VPN server device 208 (which includes a PHY 504a and a MAC address 504b) may be assigned a "physical" IP address 504c (i.e., an IP address associated with that physical network interface 504.)

Figure 5:
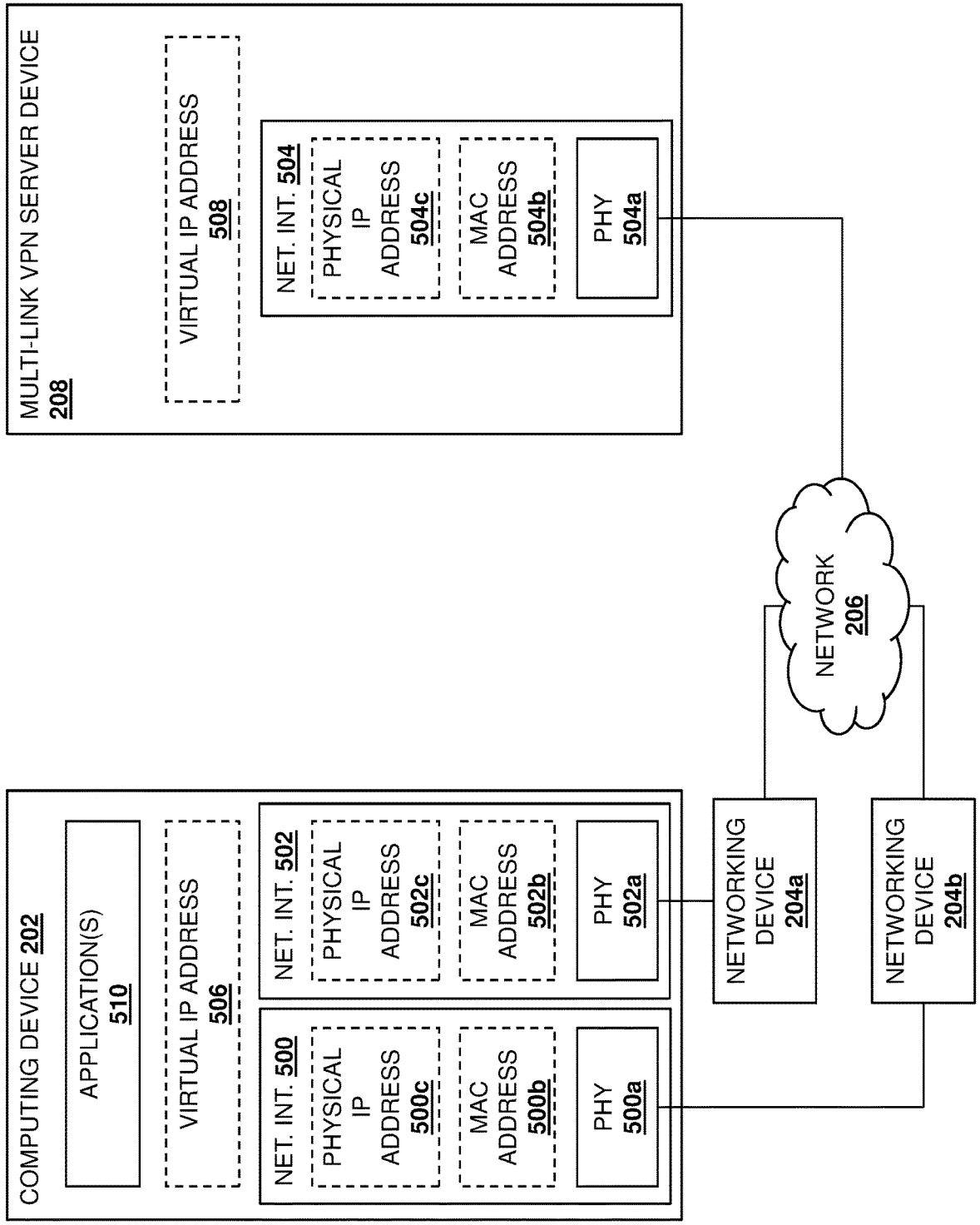
FIG. 5 is a schematic view illustrating an embodiment of the multi-link VPN link selection system of FIG. 2 operating during the method of FIG. 4.

As such, in a specific example, the establishment of the multi-link VPN connection may include the assignment of a virtual IP address 506 to the computing device 202 and in association with the network interfaces 500 and 502 in that computing device 202, along with the assignment of a virtual IP address 508 to the multi-link VPN server device 208 and in association with the network interface 504. As will be appreciated by one of skill in the art in possession of the present disclosure, the multi-link VPN connection established at block 402 may provide for the pairing or other association of the virtual IP addresses 506 and 508 in order to enable the multi-link VPN functionality discussed below. As discussed below, and as illustrated in FIG. 5, one or more applications 510 may operate on the computing device 202, and any communications involving those application(s) 510 may utilize the virtual IP address 506 (e.g., rather than the physical IP addresses 500c and 502c assigned to the network interfaces 500 and 502) to enable data traffic transmission via either of the network interfaces 500 and 502 without the need to establish a new connection or link each time a different network interface is used, as well as to provide a variety of multi-link VPN functionality that would be apparent to one of skill in the art in possession of the present disclosure.

Figure 6:
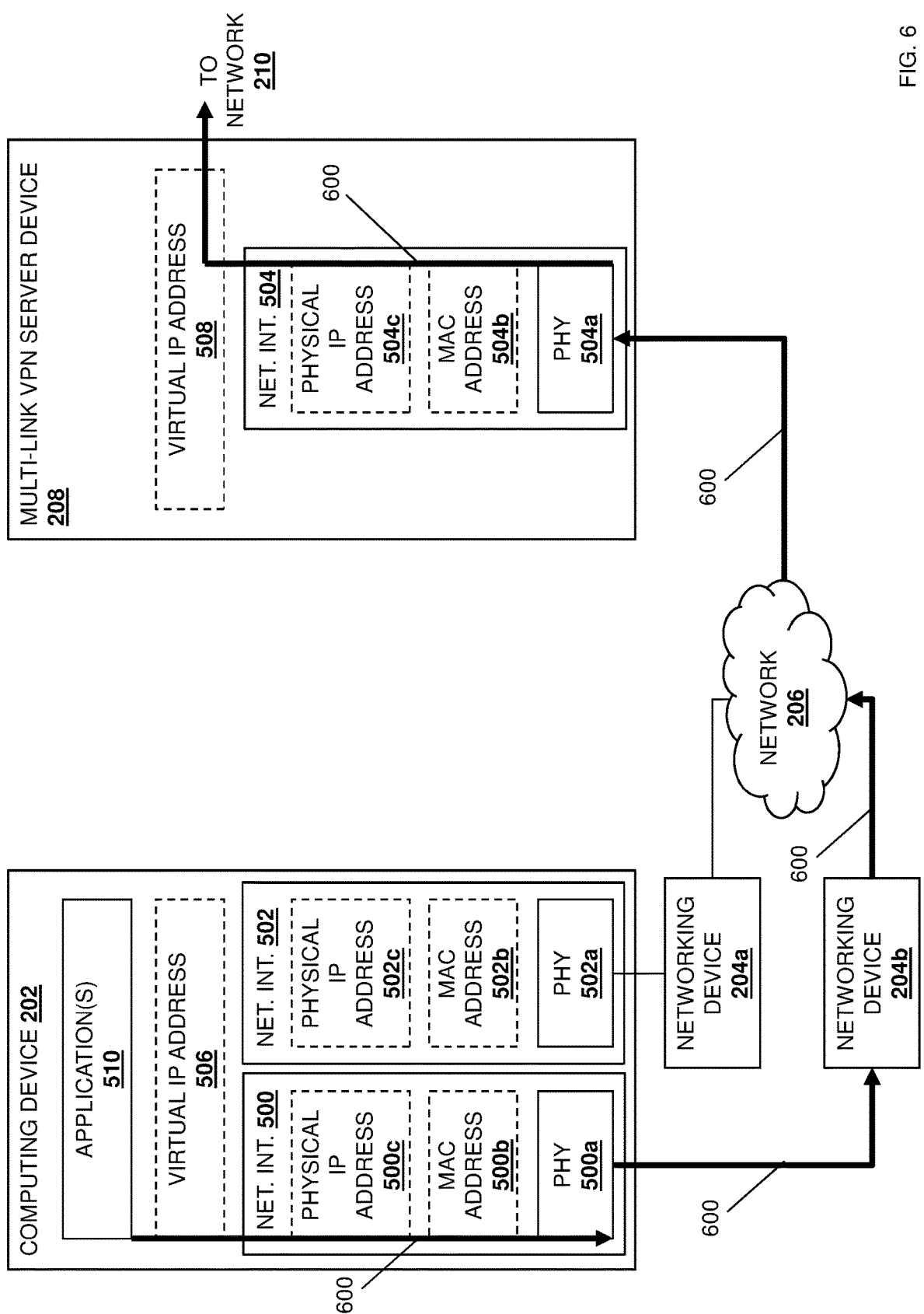
FIG. 6 is a schematic view illustrating an embodiment of the multi-link VPN link selection system of FIG. 2 operating during the method of FIG. 4.

For example, FIG. 6 illustrates how the network interface 500 in the computing device 202/300 may provide a first link, connection, and/or other path to a VPN provided by the multi-link VPN server device 208. For example, any of the application(s) 510 may generate data traffic 600 (e.g., a data packet) that includes the virtual IP address 506 as a source IP address for that data traffic, the virtual IP address 508 as the destination IP address for that data traffic, and/or any other multi-link VPN data traffic information that would be apparent to one of skill in the art in possession of the present disclosure. Those application(s) 510 may then provide that data traffic to the multi-link VPN link selection engine 304 in the computing device 202/300, and FIG. 6 illustrates how the multi-link VPN link selection engine 304 in the computing device 202/300 may transmit that data traffic 600 via the network interface 500 to the networking device 204b such that the data traffic is provided via the network 206 and to the network interface 504 in the multi-link VPN server device 208. One of skill in the art in possession of the present disclosure will appreciate that upon receiving the data traffic 600 via its network interface 504, the multi-link VPN server device 208 may then perform a variety of conventional VPN functionality to forward that data traffic 600 via the network 210 and to the application server device(s) 212. As such, FIG. 6 illustrates a particular link, connection, and/or path available to the application(s) 510 via the network interface 500 and the networking device 204b and to the VPN provided by the multi-link VPN server device 208 that enables access to the application server device(s) 212.

Figure 7:
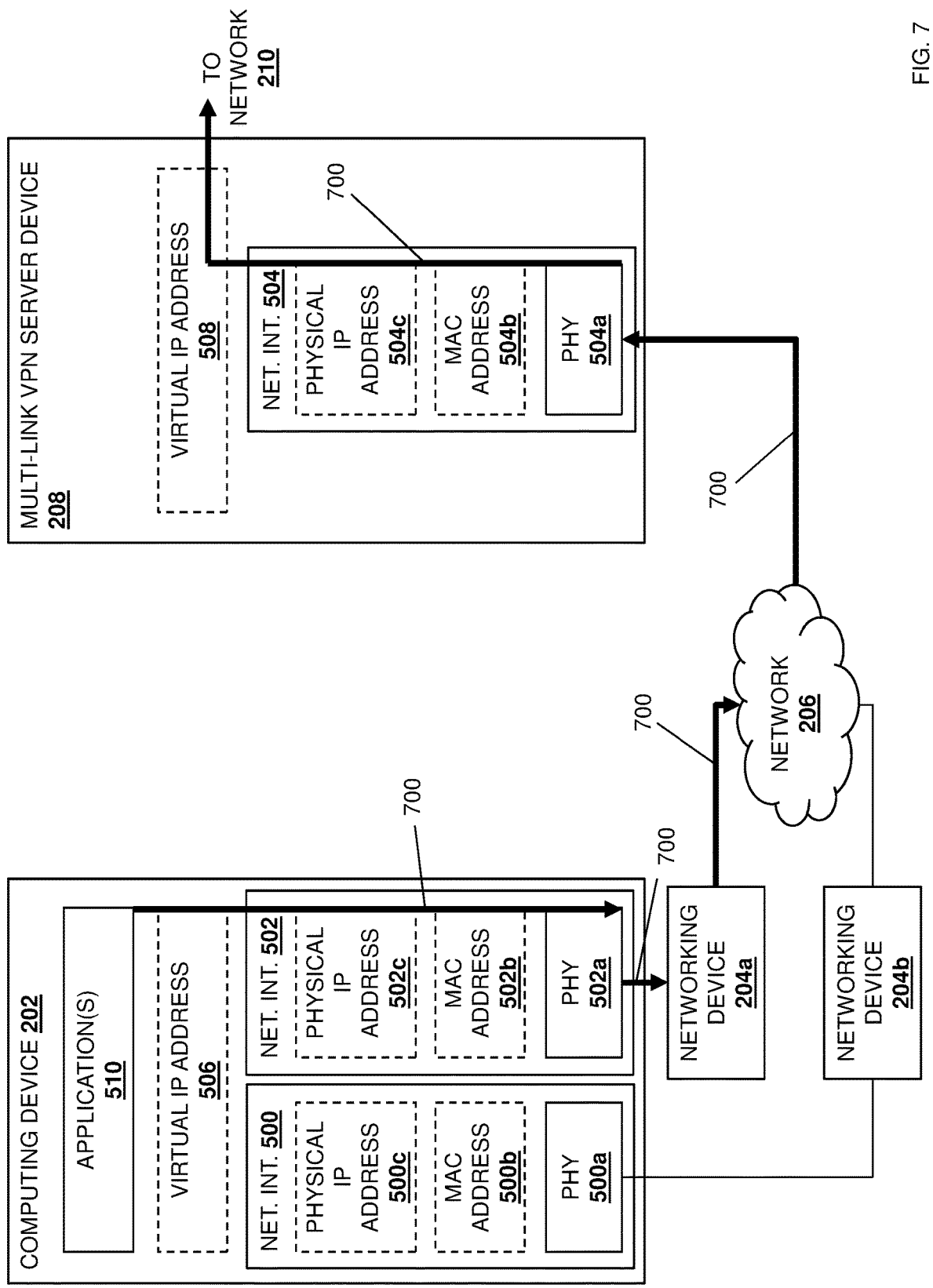
FIG. 7 is a schematic view illustrating an embodiment of the multi-link VPN link selection system of FIG. 2 operating during the method of FIG. 4.

Similarly, FIG. 7 illustrates how the network interface 502 in the computing device 202/300 may provide a second link, connection, and/or other path to a VPN provided by the multi-link VPN server device 208. For example, any of the application(s) 510 may generate data traffic 700 (e.g., a data packet) that includes the virtual IP address 506 as a source IP address for that data traffic, the virtual IP address 508 as the destination IP address for that data traffic, and/or any other multi-link VPN data traffic information that would be apparent to one of skill in the art in possession of the present disclosure. Those application(s) 510 may then provide that data traffic to the multi-link VPN link selection engine 304 in the computing device 202/300, and FIG. 7 illustrates how the multi-link VPN link selection engine 304 in the computing device 202/300 may transmit that data traffic 700 via the network interface 502 to the networking device 204a such that the data traffic is provided via the network 206 and to the network interface 504 in the multi-link VPN server device 208. One of skill in the art in possession of the present disclosure will appreciate that upon receiving the data traffic 700 via its network interface 504, the multi-link VPN server device 208 may then perform a variety of conventional VPN functionality to forward that data traffic 700 via the network 210 and to the application server device(s) 212. As such, FIG. 7 illustrates a particular link, connection, and/or path available to the application(s) 510 via the network interface 502 and the networking device 204a to the VPN provided by the multi-link VPN server device 208 that enables access to the application server device(s) 212. As discussed above, while only two links, connections, and/or paths are illustrated and described as being available to the VPN provided by the multi-link VPN server device 208, one of skill in the art in possession of the present disclosure will appreciate that any number of network interfaces in a computing device may provide any number of links, connections, and/or paths to a VPN provided by a multi-link VPN server device in a multi-link VPN system while remaining within the scope of the present disclosure as well.

The method 400 then proceeds to block 404 where the computing device monitors each of its network interfaces that provide a respective link to the multi-link VPN. In an embodiment, at block 404, the multi-link VPN link selection engine 304 in the computing device 202/300 may operate to monitor each of the network interfaces 500 and 502 in the computing device 202/300. For example, the monitoring of the network interfaces 500 and 502 in the computing device 202/300 at block 404 may include the multi-link VPN link selection engine 304 in the computing device 202/300 monitoring data traffic transmissions via the PHYs 500a and 502a in order to monitor and/or determine any of a variety of QoS parameters associated with the transmission of that data traffic. In the specific examples discussed below, at block 404, the multi-link VPN link selection engine 304 in the computing device 202/300 may monitor and/or determine a data traffic transmission latency, a data traffic transmission bandwidth, a data traffic transmission reliability, and/or any of a variety of other data traffic QoS parameters for each of the network interfaces 500 and 502 that would be apparent to one of skill in the art in possession of the present disclosure. In at least some embodiments, the monitoring performed at block 404 may be "real-time" or substantially real-time monitoring of the data transmissions on the network interfaces 500 and 502 such as, for example, real-time characterizations of each link available via the network interfaces 500 and 502, data transmission monitoring of the network interfaces 500 and 502 on the per-packet basis as described herein, and/or any other real-time monitoring techniques that would be apparent to one of skill in the art in possession of the present disclosure.

The method 400 then proceeds to block 406 where the computing device identifies one or more QoS parameters associated with each network interface. In an embodiment, at block 406 and in response to the monitoring of the network interfaces 500 and 502 at block 404, the multi-link VPN link selection engine 304 in the computing device 202/300 may identify one or more QoS parameters associated with each of the network interfaces 500 and 502. As such, continuing with the specific example provided above, at block 406 the multi-link VPN link selection engine 304 in the computing device 202/300 may identify a respective data traffic transmission latency, a respective data traffic transmission bandwidth, a respective data traffic transmission reliability, and/or any of a variety of other data traffic QoS parameters associated with data traffic transmission by each of the network interfaces 500 and 502. In some embodiments, at block 406, the multi-link VPN link selection engine 304 in the computing device 202/300 may generate a normalized network interface QoS value using the one or more QoS parameters identified for each of the network interfaces 500 and 502. For example, the normalized network interface QoS value ($QoS_n$) determined for any particular network interface may be defined by the equation:

$$QoS_n = w_1 L + w_2 B + w_3 P + w_4 C$$

where L is the data transmission latency of that network interface, B is the data transmission bit rate for the link provided by that network interface, P is the data transmission packet loss for the link provided by that network interface, C is the capacity of the link provided by that network interface, and $w_1$, $w_2$, $w_3$, and $w_4$ are constants based on design considerations of the computing device 202 and/or the multi-link VPN link selection system 200.

In some embodiments, the identification of the one or more QoS parameters associated with each of the network interfaces at block 406 may include the ranking of the network interfaces based on their associated QoS parameters. As such, at block 406, the multi-link VPN link selection engine 304 in the computing device 202/300 may rank the network interfaces in the computing device 202/300 based on their data transmission latencies (e.g., with the network interface having the lowest data transmission latency ranked the highest), their data transmission bandwidths (e.g., with the network interface having the highest data transmission bandwidth ranked the highest), their data transmission reliabilities (e.g., with the network interface having the highest data transmission reliability ranked the highest), combinations thereof, and/or based on any other QoS parameters that would be apparent to one of skill in the art in possession of the present disclosure. Furthermore, in situations where the normalized network interface QoS values are generated for the network interfaces as discussed above, at block 406 the multi-link VPN link selection engine 304 in the computing device 202/300 may rank the network interfaces based on their normalized network interface QoS values. As will be appreciated by one of skill in the art in possession of the present disclosure, the identification of the QoS parameter(s) using any of the techniques discusses above may utilize analytical models, packet probing, and/or any other technique, and may include the consideration and compensation of hysteresis effects associated with the identification of those QoS parameter(s).

The method 400 then proceeds to decision block 408 where it is determined whether data traffic has been received. In an embodiment, at decision block 408, the multi-link VPN link selection engine 304 in the computing device 202/300 may operate to determine whether data traffic has been received from the application(s) 510. As discussed above, the application(s) 510 operating on the computing device 202/300 may generate and provide data traffic (e.g., data packets) to the multi-link VPN link selection engine 304 in the computing device 202/300, and thus the multi-link VPN link selection engine 304 may monitor for any data traffic from the application(s) 510 at decision block 408. However, while the monitoring of data traffic generated by the application(s) 510 is discussed herein, one of skill in the art in possession of the present disclosure will recognize that the multi-link VPN link selection engine 304 may monitor for data traffic generated and transmitted by any component in the computing device 202/300 to the VPN provided by the multi-link VPN server device 208 while remaining within the scope of the present disclosure as well.

If, at decision block 408, it is determined that data traffic has not been received, the method 400 returns to block 404. As such, the method 400 may loop through blocks 404, 406, and 408 in order to monitor the network interfaces 500 and 502 on the computing device 202/300 at block 404 and identify QoS parameter(s) associated with those network interfaces at block 406 as long as data traffic is not received at decision block 408. If at decision block 408, it is determined that data traffic has been received, the method 400 proceeds to block 410 where the computing device may identify a network transmission requirement associated with that data traffic. In an embodiment, the multi-link VPN link selection engine 304 in the computing device 202/300 may receive data traffic from an application 510 at block 408 and, in response, the multi-link VPN link selection engine 304 may identify a network transmission requirement associated with that data traffic. For example, at block 408, the multi-link VPN link selection engine 304 in the computing device 202/300 may receive a first data packet from an application 510 and, at block 410 the multi-link VPN link selection engine 304 may identify a data packet transmission latency requirement the first data packet, a data packet transmission bandwidth requirement for the first data packet, a data packet transmission reliability requirement for the first data packet, combinations thereof, and/or any other network transmission requirement for the first data packet that would be apparent to one of skill in the art in possession of the present disclosure. Furthermore, in some embodiments, at block 408 the multi-link VPN link selection engine 304 in the computing device 202/300 may receive a first data packet from an application 510 and, at block 410 the multi-link VPN link selection engine 304 may generate a normalized network interface QoS value requirement for the first data packet using the techniques discussed above.

In some embodiments, the network transmission requirements for any data traffic may have been previously stored in the multi-link VPN link selection database 306 in association with an identifier for that data traffic, and thus the multi-link VPN link selection engine 304 in the computing device 202/300 may identify network transmission requirements for data traffic at block 410 by identifying the data traffic and retrieving the associated network transmission requirements for that data traffic from the multi-link VPN link selection database 306. Furthermore, the network transmission requirements for any data traffic generated by a particular application may have been previously stored in the multi-link VPN link selection database 306 in association with an identifier for that application, and thus the multi-link VPN link selection engine 304 in the computing device 202/300 may identify network transmission requirements at block 410 by identifying an application that generated the data traffic received at block 408, and retrieving the associated network transmission requirements for the data traffic generated by that application from the multi-link VPN link selection database 306. However, while several specific examples of the identification of network transmission requirements for data traffic have been described, one of skill in the art in possession of the present disclosure will appreciate that network transmission requirements associated with data traffic may be identified in a variety of manners that will fall within the scope of the present disclosure as well.

Furthermore, while the identification of specific network transmission requirements for data traffic is described, in some embodiments the network transmission requirements for data traffic may be default network transmission requirements that treat different data traffic (e.g., different data packets generated by different applications) equally with regard to their network transmission requirements. As such, in some embodiments, some data packets may be associated with particular network connectivity requirements that have been set by an application provider or network administrator, while all other data packets may be associated with the default network transmission requirements. Furthermore, in some embodiments all data packets may include the same (default) network transmission requirements, and thus the identification of network transmission requirements at block 410 for any received data packet may be omitted.

The method 400 then proceeds to block 412 where the computing device determines a network interface that is associated with QoS parameter(s) that satisfy the network transmission requirement associated with that data traffic. In an embodiment, at block 412, the multi-link VPN link selection engine 304 in the computing device 202/300 may determine one of the network interfaces 500 and 502 that is associated with QoS parameters that satisfy the network transmission requirement(s) associated with the data traffic received at block 408. For example, at block 412, the multi-link VPN link selection engine 304 in the computing device 202/300 may determine one of the network interfaces 500 and 502 that is associated with a data transmission latency that satisfies the data packet transmission latency requirement for the first data packet received at block 408, a data transmission bandwidth that satisfies the data packet transmission bandwidth requirement for the first data packet received at block 408, a data transmission reliability that satisfies the data packet transmission reliability requirement for the first data packet received at block 408, and/or any other QoS parameter that satisfies a network transmission requirement for the first data packet received at block 408. As will be appreciated by one of skill in the art in possession of the present disclosure, in some situations no network interface in the computing device 202/300 may satisfy each network transmission requirement for a data packet that has been received, and the multi-link VPN link selection engine 304 in the computing device 202/300 may utilize a variety of techniques to determine which of those network interfaces best satisfies (e.g., satisfies the most of) the network transmission requirements for that data packet. Similarly, at block 412, the multi-link VPN link selection engine 304 in the computing device 202/300 may determine one of the network interfaces 500 and 502 is associated with a normalized QoS value that satisfies the normalized network interface QoS value requirement for the first data packet received at block 408.

The method 400 then proceeds to block 414 where the computing device transmits that data traffic to the multi-link VPN via the network interface that satisfies the network transmission requirement associated with that data traffic. In an embodiment, at block 414, the multi-link VPN link selection engine 304 in the computing device 202/300 may transmit the data traffic received at block 408 via the one of the network interfaces 500 and 502 that was determined at block 412. As such, at block 414, the multi-link VPN link selection engine 304 in the computing device 202/300 may transmit the data traffic received at block 408 via the one of the network interfaces 500 and 502 that was determined at block 412 to satisfy the data packet transmission latency requirement for the first data packet received at block 408, the data packet transmission bandwidth requirement for the first data packet received at block 408, the data packet transmission reliability requirement for the first data packet received at block 408, and/or any other network transmission requirement for the first data packet received at block 408. Similarly, at block 412, the multi-link VPN link selection engine 304 in the computing device 202/300 may transmit the data traffic received at block 408 via the one of the network interfaces 500 and 502 that satisfies the normalized network interface QoS value requirement for the first data packet received at block 408.

Thus, in some specific examples, all data traffic received at block 408 may be transmitted by the multi-link VPN link selection engine 304 in the computing device 202/300 via the network interface associated with the lowest data transmission latency. Similarly, in some specific examples, all data traffic received at block 408 may be transmitted by the multi-link VPN link selection engine 304 in the computing device 202/300 via the network interface associated with the highest data transmission bandwidth. Similarly as well, in some specific examples, all data traffic received at block 408 may be transmitted by the multi-link VPN link selection engine 304 in the computing device 202/300 via the network interface associated with the highest data transmission reliability. Similarly as well, in some specific examples, all data traffic received at block 408 may be transmitted by the multi-link VPN link selection engine 304 in the computing device 202/300 via the network interface associated with a particular normalized network interface QoS value. As such, one of skill in the art in possession of the present disclosure will appreciate that data traffic may be transmitted via the teachings of the present disclosure in a manner that optimizes data transmission on a Layer 3 (L3)/IP level, and/or increases the overall throughput of data relative to conventional multi-link VPN systems.

Figure 8:
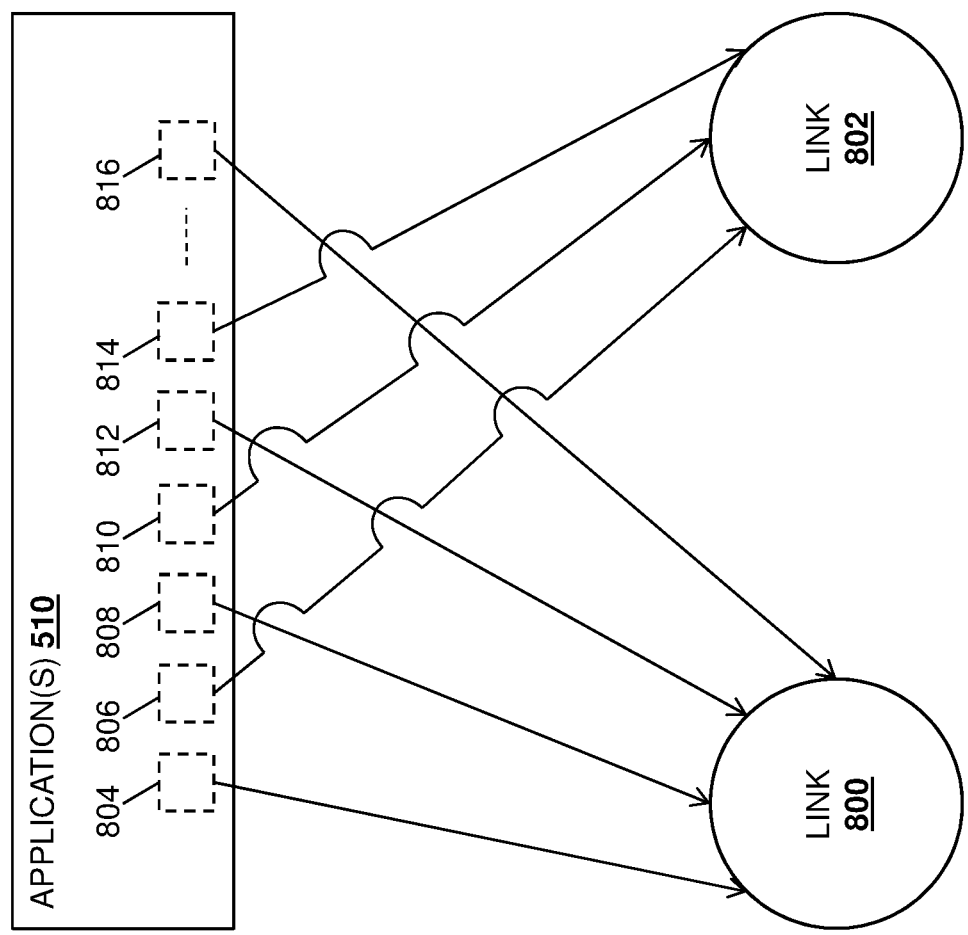
FIG. 8 is a schematic view illustrating an embodiment of link selection in the multi-link VPN link selection system of FIG. 2 during the method of FIG. 4.

Furthermore, one of skill in the art in possession of the present disclosure will appreciate how the teachings of the present disclosure may allow data traffic to be transmitted at block 414 based on relative properties of the network interfaces and/or links to the VPN. For example, FIG. 8 illustrates the application(s) 510 in the computing device 202/300, as well as a link 800 that may be provided by the network interface 500 to the VPN provided by the multi-link VPN server device 208, and a link 802 that may be provided by the network interface 502 to the VPN provided by the multi-link VPN server device 208. In some situations, each of a plurality of data packets 804, 806, 808, 810, 812, 814, and up to 816 generated by the application(s) 510 may include the same (default) network transmission requirements, and the multi-link VPN link selection engine 304 in the computing device 202/300 may be configured to determine the QoS parameters associated with the network interfaces 500 and 502 and their respective links 800 and 802, and transmit the data packets 804-816 based on the QoS parameters of those network interfaces 500 and 502 and their respective links 800 and 802.

For example, FIG. 8 illustrates a situation in which the network interfaces 500 and 502 and their respective links 800 and 802 may include the same QoS parameters, or substantially similar QoS parameters (i.e., within some QoS parameter range(s)), and thus may be considered "equal" network interfaces 500 and 502 and respective links 800 and 802. As such, the multi-link VPN link selection engine 304 in the computing device 202/300 may transmit data packets at block 414 using "First In, First Out (FIFO)" techniques by, for example, transmitting the data packet 804 via the network interface 500/link 800, transmitting the data packet 806 via the network interface 502/link 802, transmitting the data packet 808 via the network interface 500/link 800, transmitting the data packet 810 via the network interface 502/link 802, transmitting the data packet 812 via the network interface 500/link 800, transmitting the data packet 814 via the network interface 502/link 802, and transmitting the data packet 816 via the network interface 500/link 800, as illustrated in FIG. 8.

Figure 9:
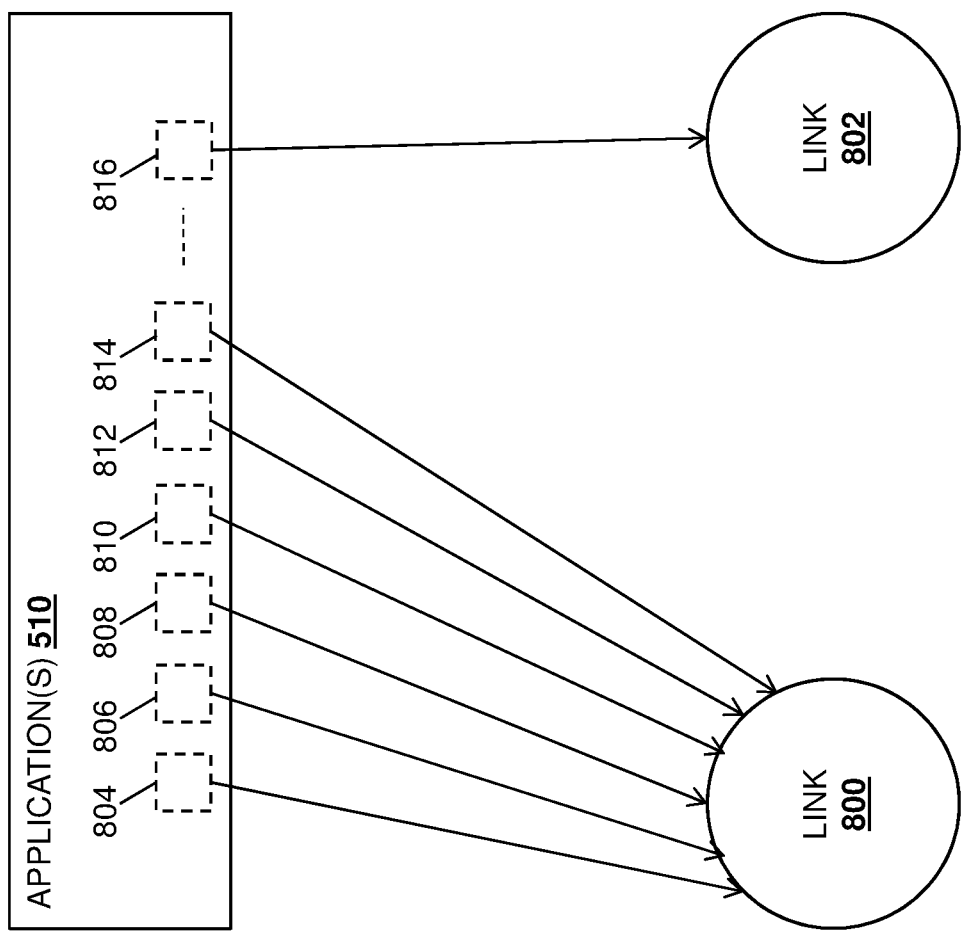
FIG. 9 is a schematic view illustrating an embodiment of link selection in the multi-link VPN link selection system of FIG. 2 during the method of FIG. 4.

In another example, FIG. 9 illustrates a situation in which the network interfaces 500 and 502 and their respective links 800 and 802 may include different QoS parameters, with the network interface 500/link 800 including "better" QoS parameters (e.g., lower data transmission latency, higher data transmission bandwidth, higher data transmission reliability, etc.) than the network interface 502/link 802. As such, the multi-link VPN link selection engine 304 in the computing device 202/300 may transmit data packets at block 414 using "water filling" techniques by, for example, transmitting each of the data packets 804-814 via the network interface 500/link 800, and transmitting the data packet 816 via the network interface 502/link 802 (e.g., when the network interface 500/link 800 has been "filled" or otherwise provided data traffic up to its data transmission capacity.)

Figure 10:
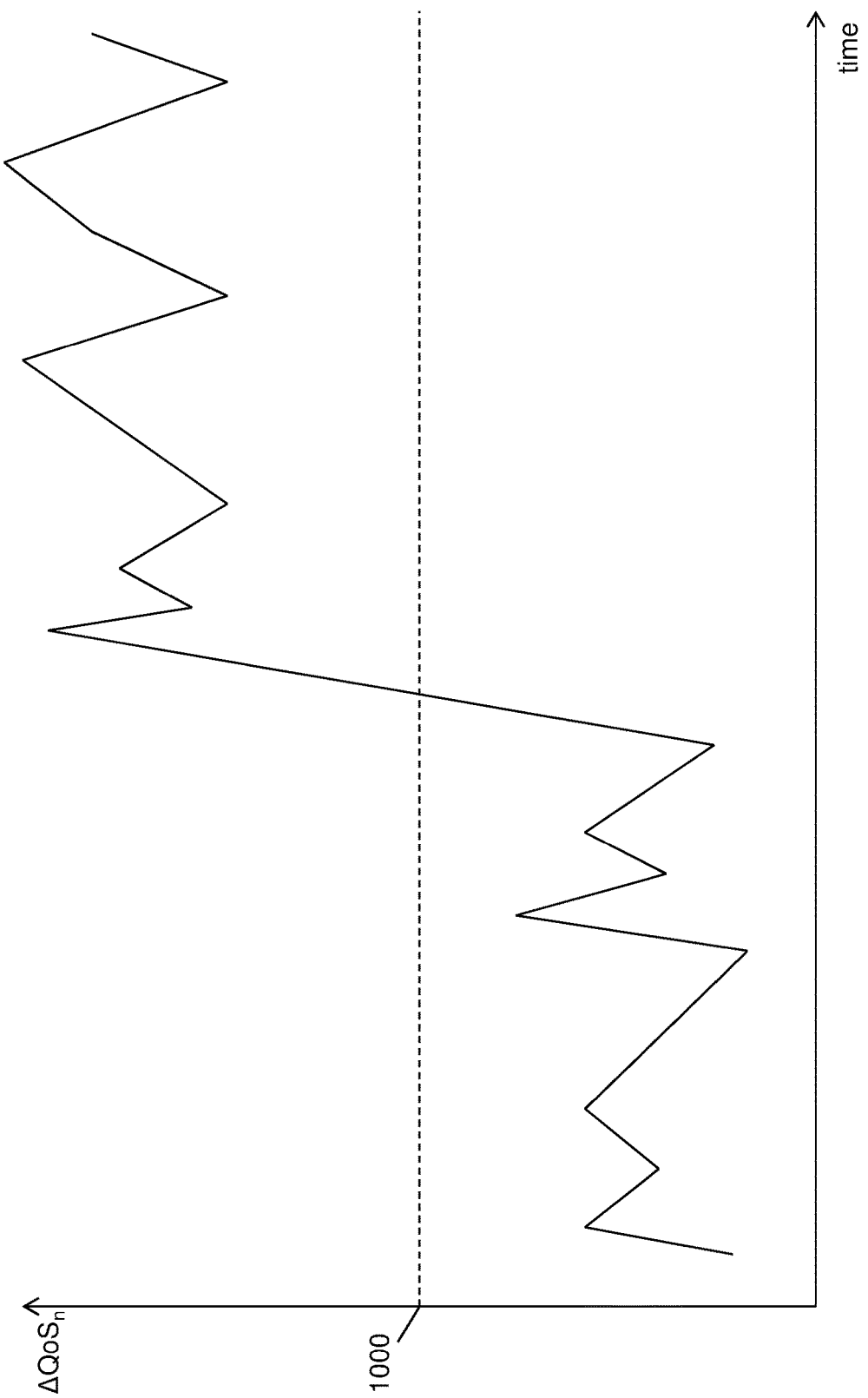
FIG. 10 is a graph view illustrating an embodiment of a method for traffic link distribution to distribute traffic over links in the multi-link VPN link selection system of FIG. 2 during the method of FIG. 4.

In yet another example, the normalized network interface QoS value discussed above may be utilized to determine which of the network interfaces 500 and 502 and their respective links 800 and 802 over which to transmit data traffic at block 414. For example, FIG. 10 illustrates a graph of a normalized network interface QoS value difference ($\Delta QoS_n$) over time (t) for a pair of network interfaces. As illustrated in FIG. 10, a link selection threshold 1000 may be set, with a normalized network interface QoS value difference below that link selection threshold 1000 resulting in the selection of one of the network interfaces for transmitting data traffic at block 414, and a normalized network interface QoS value difference above that link selection threshold 1000 resulting in the selection of the other of the network interfaces for transmitting data traffic at block 414. However, while the graph illustrated in FIG. 10 provides for network interface/link selection between two network interfaces/links, one of skill in the art in possession of the present disclosure will appreciate how a graph (or multiple graphs) may be utilized to provide for selection between more than two network interfaces/links while remaining within the scope of the present disclosure as well.

Thus, at block 414, the multi-link VPN link selection engine 304 in the computing device 202/300 may transmit the data traffic using one of the network interfaces 500 to the multi-link VPN server device 208 (e.g., through the network interface 500 and via the networking device 204b and network 206 as illustrated in FIG. 6, through the network interface 502 and via the networking device 204a and network 206 as illustrated in FIG. 7), and the multi-link VPN server device 208 may then transmit that data traffic via the network 210 to the application server device(s) 212. As will be appreciated by one of skill in the art in possession of the present disclosure, the application server device(s) 212 may respond to that data traffic via the multi-link VPN server device 208 and the same network interface/link upon which that data traffic was sent using conventional multi-link VPN techniques that would be apparent to one of skill in the art in possession of the present disclosure. The method 400 then returns to block 404. As such, network interfaces in the computing device 202/300 may be monitored to identify their QoS parameters, and data traffic may be transmitted to a VPN via those network interfaces (and their associated links) based on those QoS parameters, which allows the computing device 202/300 to optimize the transmission of data traffic to the VPN as the properties, patterns, and amounts of data traffic generated by its applications 510 changes. Furthermore, one of skill in the art in possession of the present disclosure will appreciate that the use of the virtual IP address 506 in the computing device 202/300 provides for seamless switching of data traffic between the network interfaces 500 and 502, and without the need to re-establish connections each time a different network interface is utilized to transmit data traffic.

Thus, systems and methods have been described that provide for the selection between multiple links available for transmitting data traffic from a computing device to a VPN based on one or more QoS parameters associated with those links. For example, a multi-link VPN server device provides a VPN connection to at least one application server device, and a computing device coupled to the multi-link VPN server device monitors each of a plurality of its network interfaces that each provide a respective link to the VPN connection and, in response, identifies one or more QoS parameters associated with each of the plurality of network interface. Whenever data traffic is received from at least one application operating on the computing device, the computing device may identify a network transmission requirement associated with that data traffic, determine one of the network interfaces that is associated with one or more QoS parameters that satisfy the network transmission requirements associated with that data traffic, and transmit that data traffic via that one of the plurality of network interfaces and over the one of the respective links provided by that one of the plurality of network interfaces to the at least one application server device via the VPN connection provided by the multi-link VPN server device. As such, multi-link VPN link selection systems and methods provided according to the teachings of the present disclosure may provide higher performance and/or more efficient data traffic transmission in a computing device by transmitting respective data traffic to a VPN over the most appropriate link available in a multi-link VPN.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-link Virtual Private Network (VPN) link selection system, comprising:
a multi-link Virtual Private Network (VPN) server device that is configured to:
provide a VPN connection to at least one application server device; and
a computing device that is coupled to the multi-link VPN server device and that is configured to:
monitor each of a plurality of network interfaces that are included on the computing device, that each provide a respective link to the VPN connection provided by the multi-link VPN server device, and that include a first network interface of a first type and a second network interface of a second type that is different than the first type;
identify, in response to monitoring each of the plurality of network interfaces, one or more Quality of Service (QoS) parameters that are associated with each of the plurality of network interfaces and that are based on at least a type of that network interface; and
receive data traffic from at least one application operating on the computing device and, in response:
identify a network transmission requirement associated with that data traffic;
determine one of the network interfaces that is included in the plurality of network interfaces, that provides one of the respective links to the VPN connection provided by the multi-link VPN server device, and that is associated with one or more QoS parameters that satisfy the network transmission requirement associated with that data traffic; and
transmit that data traffic via that one of the plurality of network interfaces that is associated with the one or more QoS parameters that satisfy the network transmission requirement associated with that data traffic and over the one of the respective links provided by that one of the plurality of network interfaces to the at least one application server device via the VPN connection provided by the multi-link VPN server device.

2. The system of claim 1, wherein the data traffic includes data packets, and wherein the computing device is configured to:
identify a first network transmission requirement associated with a first data packet;
determine the first network interface of the first type that is included in the plurality of network interfaces, that provides a first link to the VPN connection provided by the multi-link VPN server device, and that is associated with one or more first QoS parameters that satisfy the first network transmission requirement associated with the first data packet; and
transmit the first data packet via the first network interface and over the first link to the at least one application server device via the VPN connection provided by the multi-link VPN server device.

3. The system of claim 2, wherein the computing device is configured to:
identify a second network transmission requirement associated with a second data packet;
determine the second network interface of the second type that is included in the plurality of network interfaces, that provides a second link to the VPN connection provided by the multi-link VPN server device, and that is associated with one or more second QoS parameters that satisfy the second network transmission requirement associated with the second data packet; and
transmit the second data packet via the second network interface and over the second link to the at least one application server device via the VPN connection provided by the multi-link VPN server device.

4. The system of claim 1, wherein the one or more QoS parameters includes at least one of a latency parameter, a bandwidth parameter, a reliability parameter, a throughput parameter, and a packet size parameter.

5. The system of claim 1, wherein the plurality of network interfaces that each provide a respective link to the VPN connection provided by the multi-link VPN server device include at least two wireless network interfaces that each provide a respective wireless link to the VPN connection provided by the multi-link VPN server device.

6. The system of claim 1, wherein the computing device is configured to:
generate, for each of the plurality of network interfaces, a normalized network interface QoS value using the one or more QoS parameters identified for that network interface; and
rank each of the plurality of network interfaces using the normalized network interface QoS value generated for that network interface to provide a ranked network interface list, wherein the determining the one of the network interfaces that is associated with the one or more QoS parameters that satisfy the network transmission requirement associated with data traffic includes selecting that one of the network interfaces from the ranked network interface list.

7. An Information Handling System (IHS), comprising:
a processing system; and
a memory system that is coupled to the processing system and that includes instructions that, when executed by the processing system, cause the processing system to provide a multi-link Virtual Private Network (VPN) link selection engine that is configured to:
monitor each of a plurality of network interfaces that are coupled to the processing system, that each provide a respective link to a VPN connection, and that include a first network interface of a first type and a second network interface of a second type that is different than the first type;
identify, in response to monitoring each of the plurality of network interfaces, one or more Quality of Service (QoS) parameters that are associated with each of the plurality of network interfaces and that are based on at least a type of that network interface; and receive data traffic from at least one application and, in response:
- identify a network transmission requirement associated with that data traffic;
- determine one of the network interfaces that is included in the plurality of network interfaces, that provides one of the respective links to the VPN connection, and that is associated with one or more QoS parameters that satisfy the network transmission requirement associated with that data traffic; and
- transmit that data traffic via that one of the plurality of network interfaces that is associated with the one or more QoS parameters that satisfy the network transmission requirement associated with that data traffic and over the one of the respective links provided by that one of the plurality of network interfaces to at least one application server device via the VPN connection.

8. The IHS of claim 7, wherein the data traffic includes data packets, and wherein the multi-link VPN link selection engine is configured to:
- identify a first network transmission requirement associated with a first data packet;
- determine the first network interface of the first type that is included in the plurality of network interfaces, that provides a first link to the VPN connection, and that is associated with one or more first QoS parameters that satisfy the first network transmission requirement associated with the first data packet; and
- transmit the first data packet via the first network interface and over the first link to the at least one application server device via the VPN connection.

9. The IHS of claim 8, wherein the multi-link VPN link selection engine is configured to:
- identify a second network transmission requirement associated with a second data packet;
- determine the second network interface of the second type that is included in the plurality of network interfaces, that provides a second link to the VPN connection, and that is associated with one or more second QoS parameters that satisfy the second network transmission requirement associated with the second data packet; and
- transmit the second data packet via the second network interface and over the second link to the at least one application server device via the VPN connection.

10. The IHS of claim 7, wherein the one or more QoS parameters includes at least one of a latency parameter, a bandwidth parameter, a reliability parameter, a throughput parameter, and a packet size parameter.

11. The IHS of claim 7, wherein the plurality of network interfaces that each provide a respective link to the VPN connection include at least two wireless network interfaces that each provide a respective wireless link to the VPN connection.

12. The IHS of claim 7, wherein the multi-link VPN link selection engine is configured to:
- generate, for each of the plurality of network interfaces, a normalized network interface QoS value using the one or more QoS parameters identified for that network interface; and
- rank each of the plurality of network interfaces using the normalized network interface QoS value generated for that network interface to provide a ranked network interface list, wherein the determining the one of the network interfaces that is associated with the one or more QoS parameters that satisfy the network transmission requirement associated with data traffic includes selecting that one of the network interfaces from the ranked network interface list.

13. The IHS of claim 7, wherein the identifying the network transmission requirement associated with the data traffic includes identifying network transmission requirement associated with an application that generated that data traffic.

14. A method for selecting links in a multi-link Virtual Private Network (VPN) for transmitting data traffic, comprising:
- monitoring, by a computing device, each of a plurality of network interfaces that are included on the computing device, that each provide a respective link to a VPN connection, and that include a first network interface of a first type and a second network interface of a second type that is different than the first type;
- identify, in response to monitoring each of the plurality of network interfaces, one or more Quality of Service (QoS) parameters that are associated with each of the plurality of network interfaces and that are based on at least a type of that network interface; and
- receiving, by the computing device, data traffic from at least one application operating on the computing device and, in response:
  - identifying, by the computing device, a network transmission requirement associated with that data traffic;
  - determining, by the computing device, one of the network interfaces that is included in the plurality of network interfaces, that provides one of the respective links to the VPN connection, and that is associated with one or more QoS parameters that satisfy the network transmission requirement associated with that data traffic; and
  - transmitting, by the computing device, that data traffic via that one of the plurality of network interfaces that is associated with the one or more QoS parameters that satisfy the network transmission requirement associated with that data traffic and over the one of the respective links provided by that one of the plurality of network interfaces to at least one application server device via the VPN connection.

15. The method of claim 14, wherein the data traffic includes data packets, and wherein the method further comprises:
- identifying, by the computing device, a first network transmission requirement associated with a first data packet;
- determining, by the computing device, the first network interface of the first type that is included in the plurality of network interfaces, that provides a first link to the VPN connection, and that is associated with one or more first QoS parameters that satisfy the first network transmission requirement associated with the first data packet; and
- transmitting, by the computing device, the first data packet via the first network interface and over the first link to the at least one application server device via the VPN connection.

16. The method of claim 15, further comprising:
- identifying, by the computing device, a second network transmission requirement associated with a second data packet;
- determining, by the computing device, the second network interface of the second type that is included in the plurality of network interfaces, that provides a second link to the VPN connection, and that is associated with one or more second QoS parameters that satisfy the second network transmission requirement associated with the second data packet; and transmitting, by the computing device, the second data packet via the second network interface and over the second link to the at least one application server device via the VPN connection.

17. The method of claim 14, wherein the one or more QoS parameters includes at least one of a latency parameter, a bandwidth parameter, a reliability parameter, a throughput parameter, and a packet size parameter.

18. The method of claim 14, wherein the plurality of network interfaces that each provide a respective link to the VPN connection include at least two wireless network interfaces that each provide a respective wireless link to the VPN connection.

19. The method of claim 14, further comprising:

generating, by the computing device for each of the plurality of network interfaces, a normalized network interface QoS value using the one or more QoS parameters identified for that network interface; and ranking, by the computing device, each of the plurality of network interfaces using the normalized network interface QoS value generated for that network interface to provide a ranked network interface list, wherein the determining the one of the network interfaces that is associated with the one or more QoS parameters that satisfy the network transmission requirement associated with data traffic includes selecting that one of the network interfaces from the ranked network interface list.

20. The method of claim 14, wherein the identifying the network transmission requirement associated with the data traffic includes identifying network transmission requirement associated with an application that generated that data traffic.

\* \* \* \* \*